June 23, 1936.   L. F. CARTER   2,044,899
GYROSCOPIC COMPASS
Filed July 16, 1931   2 Sheets-Sheet 1

INVENTOR
Leslie F. Carter
BY
Joseph H. Lipschutz
ATTORNEY

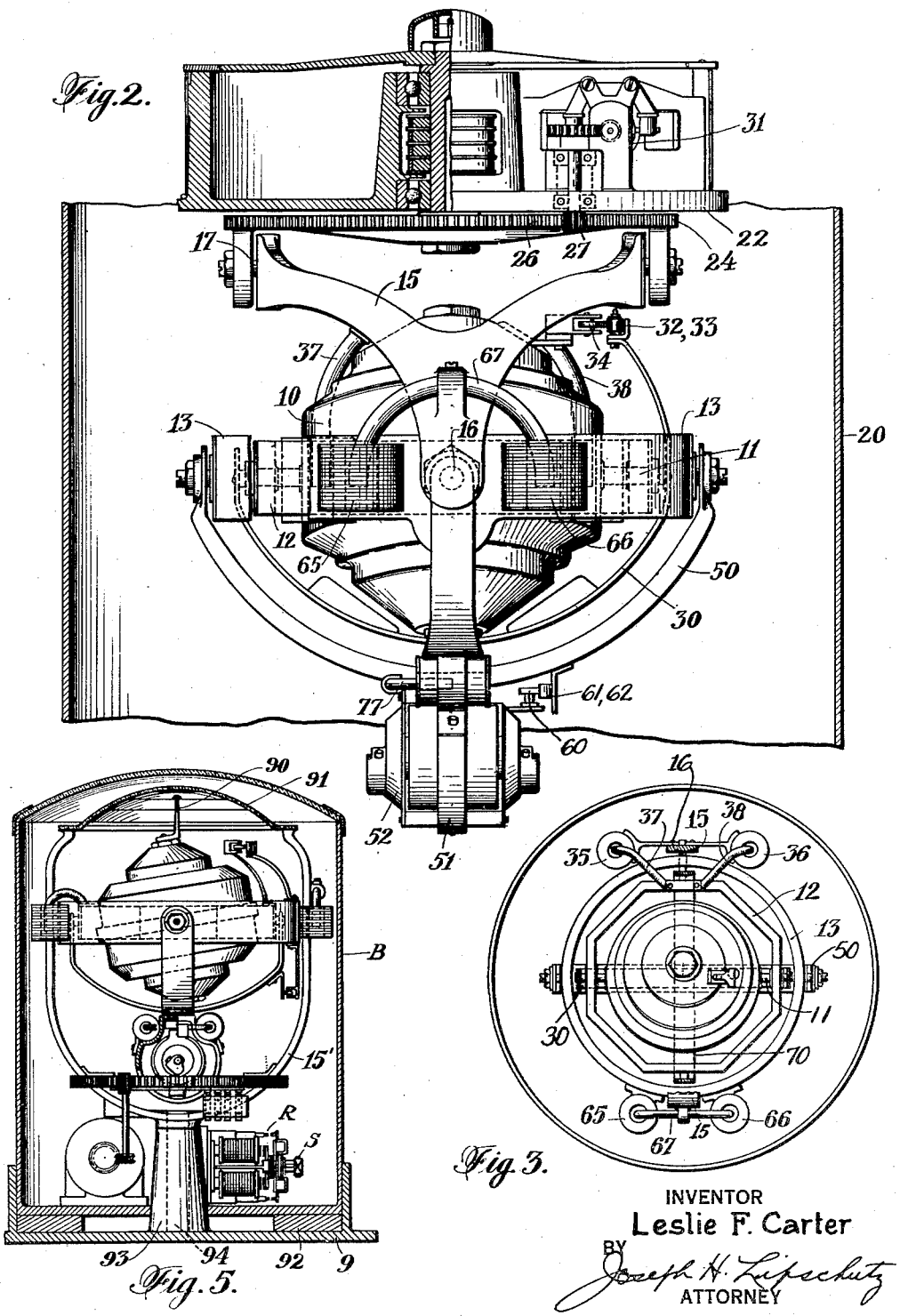

Patented June 23, 1936

2,044,899

UNITED STATES PATENT OFFICE 2,044,899

GYROSCOPIC COMPASS

Leslie F. Carter, Leonia, N. J., assignor, by mesne assignments, to Sperry Products Inc., Brooklyn, N. Y., a corporation of New York Application July 16, 1931, Serial No. 551,138

8 Claims. (Cl. 33—226)

This invention relates to gyroscopic compasses and has for its object the provision of a compass of this type which shall be non-pendulous and therefore free of acceleration errors.

A further object of the invention is the provision of a gyro compass having a substantially vertical spinning axis and which utilizes the W—E component of the earth's rotation in order to give a quick response of the gyro to such rotation. This results in the advantage of a rapid rate of orientation. A further advantage of the substantially vertical spinning axis lies in the fact that the compass system is substantially symmetrical about the vertical axis and therefore no compensating weights are necessary as in the present types of gyro compasses in order to render the compass symmetrical about the vertical axis.

A further object of the invention is the provision of a gyro compass which will settle on the meridian with a dead-beat movement and will not oscillate around the settling point like the present day gyro compasses.

It is a further object of my invention to provide a gyroscopic compass which shall be substantially free of latitude error. This arises from the fact that I employ a gyroscope with a spinning axis inclined in the E—W plane so that the principal movement of said axis with respect to the earth's rotation is in the E—W plane, which therefore does not affect the position of said compass with respect to the meridian.

Still another object of my invention is the provision of a gyro compass in which the expansion of the rotor does not introduce an error in the settling point of the compass, as is the case in the other forms of gyroscopic compasses.

Another object of my invention is the provision of a gyroscopic compass which can also be utilized at the same time as an inclinometer to give an indication of banking and grade.

Another object of my invention is the provision of a gyroscopic compass in which the gyro casing is normally disconnected from any energy abstracting device such as the eccentric connection between the mercury ballistic and the gyro casing in the Sperry compass, and is therefore free of turning error.

Further objects and advantages of this invention will become apparent in the following detailed description thereof.

In the accompanying drawings,

Fig. 2 is a view similar to Fig. 1, taken at right angles thereto.

Fig. 3 is a plan view of the Figs. 1 and 2 form of the invention.

Fig. 5 is a modified form of my invention, showing a combined gyro compass and inclinometer.

Figures 1, 4, 6:
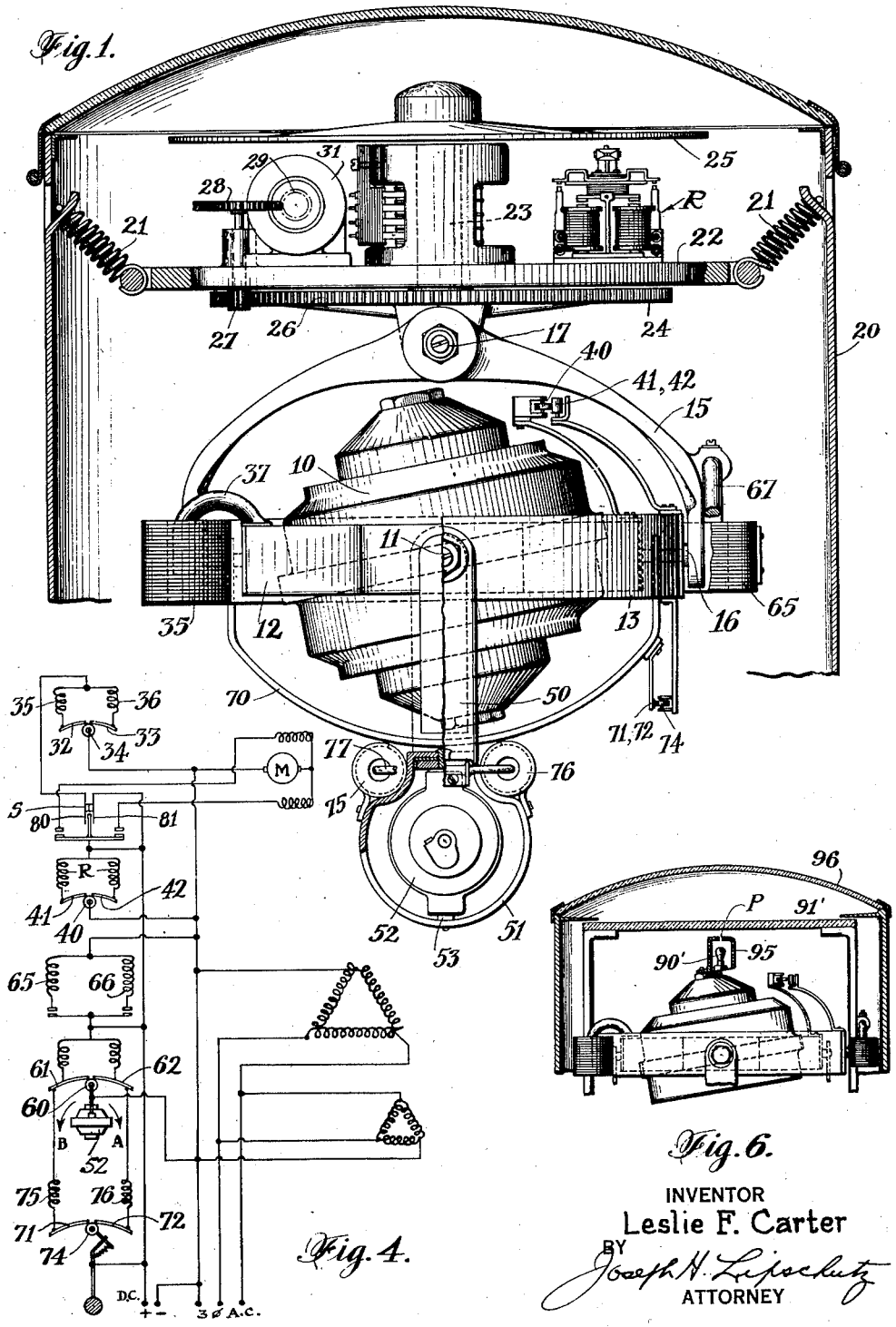
Fig. 1 is a front elevation of a gyroscopic compass with the enclosing binnacle partly sectioned vertically and partly removed, the said compass embodying one form of my invention.
Fig. 4 is a wiring diagram of the mechanism employed in the Figs. 1 and 2 form of the invention.
Fig. 6 is a vertical section through a modified form of the Fig. 5 device.

Referring to Figures 1 and 2, I have shown a gyroscopic compass which comprises a rotor journalled within a casing 10, said casing being mounted for oscillation about an axis 11 within a gimbal ring 12, the said ring being in turn journalled for oscillation within a frame 15 about an axis 16. An outer ring 13 is also supported upon axis 16 for a purpose to be described hereinafter. The said frame or yoke 15 is supported from the binnacle 20 by means of a plurality of springs 21 supporting a plate 22 within which a plate 24 is journalled for rotation about a vertical axis by a shaft 23. The yoke 15 is suspended from the lower side of said plate for oscillation about an axis 17. The said shaft 23 carries at its upper end the compass card 25, and the plate 24 may have formed around its periphery an annular gear 26, with which is designed to mesh a pinion 27 which may be driven by suitable gearing 28 and 29 from an azimuth motor 31 supported upon the fixed plate 22. By this means the entire sensitive element of the compass, including the card 25, yoke 15, and gyro 10 may be rotated in azimuth about a vertical axis.

The gyro with its enclosing case 10 is mounted upon the axis 11 in neutral equilibrium so that it will remain in any position in which it is placed. I prefer to maintain this gyro element with its spinning axis normally substantially vertical, that is, inclined slightly with respect to the vertical in an E—W direction. If the gyro can be so maintained, then the axis of support 11 will be in the meridian, in other words, the axis 11 will determine N—S while the spinning axis of the gyro will be inclined in a plane at right angles to the meridian, in other words, in an E—W plane. In order to hold the gyro with its spinning axis at a given angle to the vertical, I may provide means such as a pendulous ball 30 (see Fig. 2) for maintaining a vertical base line and carrying a pair of spaced contact segments 32, 33. The gyro case is provided with a trolley 34 fixed thereto and so positioned with respect to the case that when the gyro axis is inclined with respect to the vertical the proper amount said trolley will rest upon both contact segments 32 and 33. Said contact segments control the circuit through a pair of solenoids 35, 36 (see Fig. 3) mounted on support 15, which co-act with core members 37, 38 fixed to the inner ring 12. When trolley 34 is in engagement with both contacts 32 and 33, the core members 37 and 38 are attracted equally and oppositely; but when trolley 34 moves off one of the contact segments, one of the magnets 35, 36 is deenergized and the core of the energized solenoid exerts a torque around the horizontal axis 16 in the proper direction to cause precession around axis 11 to restore the inclination of the gyro to its original degree, in other words, to the position where trolley 34 again rests upon both segments 32 and 33. I have thus provided a means for maintaining the gyro axis inclined to the vertical at a constant angle regardless of any angular displacements due to the rotation of the earth or to forces such as friction, which would tend to change such angle.

I have also provided means for orienting the compass in azimuth. Such means is designed to be brought into operation whenever the predetermined relative positions of inner and outer rings 12 and 13 are disturbed. In the drawings, I have shown the normal position of the gyro consisting of a gyro inclination with respect to the vertical in an E—W plane and the two rings 12 and 13 in coincident planes. It will be understood from the description which follows that these planes need not be co-incident normally but may have a certain relative angular position. In either of these cases when movement of the base, such as the ship on which the compass is mounted, occurs and there is a tendency to carry yoke 15 and the entire gyro around in azimuth, or when, due to the prolonged action of the earth's rotation, the axis of the gyro acquires a N—S component of tilt, then it will be seen that the predetermined relationship between rings 12 and 13 will be changed, because ring 12 operates around the inclined axis of the gyro while ring 13 operates around a vertical axis, e. g., the vertical axis about which the craft is turning. Such relative movement between rings 12 and 13 may be caused to displace a trolley 40 carried by ring 12 with respect to a pair of contact segments 41, 42, such contact segments being mounted upon ring 13. The trolley 40 is so positioned with respect to the contact segments that when the rings occupy their predetermined normal relationship, trolley 40 engages both contact segments to energize equally both windings of a relay R controlling reversible motor 31, but as soon as this predetermined positioning is disturbed either by tilting of the gyro axis in a N—S direction due to the earth's rotation or by rotation of the base or ship in azimuth, then trolley 40 leaves one of the contact segments 41 or 42 to energize the azimuth motor 31 in one direction or the other to rotate the entire sensitive element of the gyro compass through gearing 26, 27, 28 and 29 until trolley 40 again engages both contact segments. Means are provided as hereinafter described for stabilizing the ring 13 in a given plane.

The theory of operation of my compass can now be explained. If the gyro is set spinning at the equator with the axis of controlled tilt 11 in the meridian, that is, pointing N—S, then the only tendency to movement of the gyro will be around the axis 11, or, in other words, the only tendency to movement of the gyro axis will be in an E—W plane with the upper end of the gyro axis tending to move downwardly to meet the earth, in other words, tending to increase the angle of inclination with respect to the vertical. This tendency is quickly and effectively counteracted by the trolley 34, contact segments 32, 33, and magnets 35, 36 as hereinbefore described. If the gyro is set in operation with the axis 11 not in the meridian, then the action of the earth in rotating will tilt the gyro axis not only in a direction tending to increase the angle of tilt with respect to the vertical, but also in a N—S direction, that is, perpendicular to the plane of the paper, and will cause the west side of ring 12 to be moved downwardly with the point of said ring that is due West having the greatest depression. The tendency to increase the angle of inclination with respect to the vertical is counteracted as hereinbefore described, while the N—S component of movement of the compass tends to change the relative positions of rings 12 and 13 as hereinbefore described to energize the azimuth motor and turn the entire sensitive element in azimuth until the N—S component of the gyro axis has been taken out and the gyro axis is in the E—W plane. In other words, it will be seen that I have established a stable position of the gyro with its spinning axis in the E—W plane and the axis of oscillation 11 in the meridian.

This operation as described is true in any other latitude, because when the axis of oscillation 11 in any latitude is in the meridian, then the only response of the gyro axis to the earth's rotation for a considerable period of time is in the E—W plane and is counteracted by the magnets 35, 36. If the axis 11 is not in the meridian, then there will be a N—S component of tilt of the gyro axis which will cause the entire sensitive element to be rotated until the gyro axis is in the E—W plane and the axis of oscillation 11 is in the meridian. It will be understood that in any latitude with the axis 11 in the meridian, the torque that is being applied by magnets 35, 36 continuously as the earth rotates is sufficient to keep said axis 11 in the meridian as the earth rotates.

When the ship yaws, the same operation takes place as hereinbefore described, since the gyro axis tends to maintain its position in space, and thus there is caused a change in relative positioning between rings 12 and 13 to energize the azimuth motor in the proper direction to restore the gyro to the position where the axis 11 is in the meridian, in other words, to rotate the sensitive element in a direction contrary to the direction of yaw of the ship.

It will be apparent that I have devised a compass that is practically dead-beat in its meridian-seeking action. This is due to the fact that as soon as the compass has been oriented to the extent that axis 11 is in the meridian, a stable position has been reached where the only effect of the earth's rotation is to tend to increase the angle of inclination with respect to the vertical, which tendency is promptly counteracted by the magnets.

It will also be seen that as a consequence of employing a substantially vertical spinning gyro (the angle of inclination may be about 5°), the gyro is substantially symmetrical about the vertical axis and it is therefore not necessary to employ compensating weights to achieve such symmetry and prevent errors in settling position due to rolling of the craft on which the compass is mounted.

An examination of the compass described discloses that there is no energy-abstracting connection between the gyro and its support for the purpose of achieving damping as in the Sperry gyro-compass. Hence, there is no such error in the settling position due to turning of the craft as arises in the said Sperry compass and which makes necessary the elimination of the damping torque on the gyro during turning.

In the Sperry compass, the N end of the gyro axis describes a flat ellipse in response to the earth's rotation, and meridian-seeking is imparted by transfer of mercury in response to the slow and small vertical tilt of the gyro axis (corresponding to the minor axis of the ellipse) rather than the large and rapid horizontal movement (i. e., E—W, corresponding to the major axis of the ellipse). In the compass here described response to the earth's rotation depends upon the E—W movement, which corresponds to the large and quick horizontal movement of the gyro axis in the Sperry compass. Thus, quick orientation of the compass is obtained.

I prefer to mount the gyro for support about the axis 11, which is the axis normally lying in the meridian. By this construction I avoid an error in settling which arises in compasses like the Sperry compass when the gyro expands due to heating up during operation. In expanding along the axis 11 weight is applied around the axis 16 to cause the gyro to precess around axis 11 to tend to increase the angle of inclination with respect to the vertical, but this tendency is promptly counteracted by the magnets which hold the angle of inclination constant. No error arises, therefore, whereas in the Sperry compass such expansion causes a change in settling position.

From the above description, it will be understood that the ring 13 must be stabilized in a given plane, in this case a horizontal plane, and for this purpose I have provided means which may take the form of a stabilizing gyroscope designed to maintain this plane at all times, regardless of acceleration. While a pendulum may be employed, such pendulum would be subject to acceleration errors so that an incorrect positioning of the compass would result whenever there was acceleration. This is not the case with my stabilizing gyroscope which opposes any tendency of the ring to become displaced in response to short-period acceleration forces. For this purpose I have shown a ring or bail 50 fixed to ring 13 so that said ring and bail 50 are movable about the same axis of suspension 16, said ring supporting, as by means of a bracket 51, a gyroscope enclosed within a casing 52 and shown as having a horizontal spinning axis. The plane of the gyro rotor is such that any tendency toward acceleration in a N—S direction would cause said gyro to precess about its axis of support 53 within said ring and support 51, and in so precessing would deliver a counteracting torque sufficient to maintain the bail 50 and hence ring 13 in original position. For restoring the stabilizing gyro to its initial position as well as for preventing it from getting into an inoperative position with the plane of the rotor in the direction of acceleration, I cause such precession to control a circuit through a trolley 60 carried by the gyro and contact segments 61, 62 carried by ring 50. Trolley 60 normally rests upon both contact segments 61 and 62, when the gyro is in unprecessed position, to energize solenoids 65 and 66 carried by ring 13 and co-acting with a core 67 fixed to the yoke 15. Upon precession of the gyroscope 52, trolley 60 moves out of engagement with contact segment 61 or 62 to deenergize solenoid 65 or 66. Since the yoke 15 is fixedly supported, the deenergization of magnet 65 or 66 will cause the other magnet to pull upon ring 13 around its axis 16 and therefore cause precession of the gyro 52 around a vertical axis back to its unprecessed position.

It may be possible for the stabilizing system to be inclined about the axis 16 for some reason, as, for instance, when it is supported in an inclined position, and the attempt of gravity to lower this system will cause the gyro 52 to precess and cause trolley 60 to leave contact segment 61 or 62 to deenergize magnet 65 or 66 so that the magnet which remains energized will then oppose the gravity restoring forces and tend to keep the stabilizing system in its inclined position. To obviate this condition, I provide an erector mechanism which may consist of a pendulous element such as 70, which will establish a vertical base line, and a set of contacts and a trolley carried respectively by the pendulous element 70 and the stabilizing system. Thus, in Fig. 1, I have shown a trolley 74 carried by the ring 13 which is stabilized by the gyro 52 and which normally engages contact segments 71, 72 carried by the pendulous element 70. When the stabilizing system becomes inclined, trolley 74 will disengage contact segment 71 or 72 to deenergize magnet 75 or 76 carried by the stabilizing system and which are adapted to act upon core 77 connected to the vertical axis of the gyro 52. The magnet which remains energized exerts a torque about the vertical axis of the stabilizing gyro which will cause movement of the entire stabilizing system around the horizontal axis 16 until trolley 74 again rests upon both contacts 71 and 72, which means that the stabilizing system has been restored to the vertical.

The erecting system described in the preceding paragraph will obviously be actuated when the pendulous element 70 is thrown upwardly due to acceleration and such movement of the pendulous element would cause magnet 75 or 76 to be deenergized and thus result in swinging the stabilizing system out of the vertical whenever acceleration occurs. To prevent such an operation of the erector system, I take advantage of the fact that acceleration and gravity exert torques in opposite directions upon the stabilizing gyro. I can therefore wire my system in such manner that when the circuit is closed by trolley 60 engaging only contact 61 or 62 due to acceleration, then the circuit through magnets 75 and 76 remains open, in other words, the erecting system is rendered ineffective during acceleration. When, however, the circuit is closed by trolley 60 engaging only contact 61 or 62 due to the action of gravity which, as hereinbefore stated, is in a direction opposed to the precession of the gyro due to acceleration, then the circuit through the erecting magnets is closed and the erecting system is effective to restore the stabilizing system to vertical in case it has become displaced therefrom. Such a wiring system is illustrated in Fig. 4 wherein it will be seen that when the stabilizing gyro 52 precesses in the direction of arrow A, for instance, in response to acceleration, trolley 60 disengages 61 and remains in engagement with contact segment 62. This, however, does not close the circuit through magnet 76 because the pendulous bail 70 is moved in response to acceleration in such direction that trolley 74 disengages contact 72 and remains in engagement with contact segment 71. This, it will be seen, prevents closure of the circuit through magnet 76. On the contrary, when the stabilizing gyroscope 52 precesses due to gravity it will precess in an opposite direction as indicated by arrow B, so that trolley 60 remains in engagement with contact 61 to close the circuit through magnet 75 since trolley 74 will at that time be in engagement with contact 71. It will be understood that if the inclination of the stabilizing gyroscope is in the opposite direction, the precession of the gyroscope will be in the direction of arrow A, but trolley 74 will be in engagement with contact 72, in this direction of inclination, so that the circuit through erecting magnet 76 will be closed.

It will be apparent from a study of the drawings and the description herein that when the craft turns in azimuth the pendulous element 30 will be thrown outwardly, which will cause a relative displacement between trolley 34 and contacts 32, 33, which will in turn result in giving the gyro an incorrect inclination. To obviate this condition, I provide means whereby the operation of the tilt-control system, including the aforesaid trolley and contacts and the magnets 35, 36, is rendered ineffective during turning of the craft. As hereinbefore described, when the craft turns in azimuth the azimuth motor 31 is energized through a relay R. In connection with said relay there is employed a switch S which lies in the circuit of the tilt-control magnets 35, 36 (see Fig. 4) and serves to break the circuit through said magnets whenever the relay R is energized to operate the azimuth motor. As shown in said Fig. 4, there is a certain amount of play between the prong 80 of said switch S and the contact members 81, 82 to allow for a certain normal yawing movement of the craft without rendering the tilt-control ineffective.

In Figs. 5 and 6 I have disclosed a modification of my invention which enables the same to be employed as a combined compass and inclinometer. I accomplish this merely by supporting the sensitive element of the compass, that is the gyroscope and its rings, from the base rather than from a suspended yoke 15. The azimuth motor is also supported in the base, thus leaving the upper surface of the device free so that an index 90 may co-operate with a calibrated dome 91, said dome carrying graduations for both direction and degrees of inclination. As shown, the compass binacle B is supported in the base 9 on resilient supports 92. On said base is fixed a hub 93 within which is supported a trunnion 94 carrying the compass yoke member 15'. The rings of the gyroscope are supported in said yoke 15' on the same horizontal axes as in Fig. 2 and in such manner that all rolling and pitching of the craft takes place about an axis through the intersection of the horizontal axes. Thus, the index 90 gives a true indication of inclination of the craft with respect to the gyro, which is fixed in position. The ordinary compass, such as the Sperry compass, cannot give an indication of inclination for the reason that the compass is suspended from a point removed from the intersection of the horizontal axes of support so that turning of the craft does not take place about the intersection of said horizontal axes.

In Fig. 6, I have shown a slight modification of Fig. 5 form of the invention wherein a small light 90' is carried by the compass instead of the index 90, the said light projecting through a pin-hole opening P in a casing 95 within which said light is enclosed. Thus, a spot of light will be projected on a ground glass cover 91'. Said cover may be flat instead of dome shaped, and the circular graduations instead of being equidistant one from the other are at successively smaller distances to compensate for the fact that the cover is flat and not dome shaped. In other words, the graduations on the disc 91' are a horizontal projection of the graduations on the dome shaped cover 91. The binnacle may be closed by the clear glass plate 96.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. A gyro compass adapted to be mounted on a craft, said compass comprising a gyroscope, means for supporting said gyroscope, means for maintaining the spinning axis of the gyroscope tilted at a predetermined inclination to the vertical in an E—W plane, and means for rendering said tilt-control means ineffective during turning of the craft.

2. A gyro-compass comprising a non-pendulous gyro, a support mounting said gyro with three degrees of freedom including its spinning axis and and two mutually perpendicular tilt axes, means for maintaining the spinning axis of the gyro at a predetermined small inclination to the vertical, and means responsive to the component of angular movement relatively to said support of one tilt axis in the vertical plane therethrough, for maintaining said last-mentioned tilt axis in the meridian and said spinning axis in the E—W vertical plane.

3. A gyro-compass comprising a non-pendulous gyro, means supporting said gyro so that its spinning axis may tilt about a second axis, means maintaining the spinning axis at a predetermined small angle to the vertical, said supporting means including a reference member movable about said inclined gyro axis, a second reference member carried by said supporting means and movable about an axis at an angle to the gyro axis, and means controlled by relative inclination between said members as the craft turns for maintaining said second axis of tilt of said gyro in the meridian and said spinning axis in the E—W vertical plane.

4. A gyro-compass comprising a non-pendulous gyro, means supporting said gyro so that its spinning axis may tilt about a second axis, means maintaining the spinning axis at a predetermined small angle to the vertical, said supporting means including a reference member movable about said inclined gyro axis, a second reference member carried by said supporting means and movable about an axis at an angle to the gyro axis, means controlled by relative inclination between said members as the craft turns for maintaining said second axis of tilt of said gyro in the meridian and said spinning axis in the E—W vertical plane, and means for stabilizing said second reference member.

5. A gyro compass comprising a non-pendulous gyro, means supporting said gyro so that its spinning axis may tilt about a second axis, means maintaining the spinning axis at a predetermined small angle to the vertical, said supporting means including a reference member, a second reference member carried by said supporting means, means controlled by relative inclination between said members as the craft turns for maintaining said second axis in the meridian and said spinning axis in the E—W vertical plane, means for stabilizing said second member including a stabilizing gyro responsive to acceleration forces, and means controlled by the stabilizing gyro upon deviation from normal position for applying a torque thereto to cause a precession restoring said normal position.

6. A gyro compass comprising a non-pendulous gyro, means supporting said gyro so that its spinning axis may tilt about a second axis, means maintaining the spinning axis at a predetermined small angle to the vertical, said supporting means including a reference member, a second reference member carried by said supporting means, means controlled by relative inclination between said members as the craft turns for maintaining said second axis in the meridian and said spinning axis in the E—W vertical plane, means for stabilizing said second member, and means whereby said stabilizing means is maintained vertical.

7. A gyro compass comprising a non-pendulous gyro, means supporting said gyro so that its spinning axis may tilt about a second axis, means maintaining the spinning axis at a predetermined small angle to the vertical, said supporting means including a reference member, a second reference member carried by said supporting means, means controlled by relative inclination between said members as the craft turns for maintaining said second axis in the meridian and said spinning axis in the E—W vertical plane, means for stabilizing said second member, and means whereby said stabilizing means is maintained vertical, said last-named means including a pendulous element, means responsive to acceleration, and means whereby said acceleration-responsive means renders said vertical-maintaining means ineffective during acceleration.

8. A gyro compass comprising a non-pendulous gyro, means supporting said gyro so that its spinning axis may tilt about a second axis, means maintaining the spinning axis at a predetermined small angle to the vertical, said supporting means including a reference member, a second reference member carried by said supporting means, means controlled by relative inclination between said members as the craft turns for maintaining said second axis in the meridian and said spinning axis in the E—W vertical plane, means for stabilizing said second member including a stabilizing gyro responsive to acceleration forces, means controlled by the stabilizing gyro upon deviation from normal position for applying a torque thereto to cause a precession restoring said normal position, and means whereby said stabilizing means is maintained vertical, said last-named means including erecting means adapted to be rendered effective by the action of gravity on said stabilizing gyro, means responsive to acceleration, and means whereby said acceleration-responsive means renders said erecting means ineffective by the action of acceleration on said stabilizing gyro.

LESLIE F. CARTER.